(12) United States Patent
Richardson et al.

(10) Patent No.: US 6,337,654 B1
(45) Date of Patent: Jan. 8, 2002

(54) A-SCAN ISAR CLASSIFICATION SYSTEM AND METHOD THEREFOR

(75) Inventors: Dennis W. Richardson, Apalachin; Patrick S. Ryan, Endicott, both of NY (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/434,515

(22) Filed: Nov. 5, 1999

(51) Int. Cl.[7] .............................. G01S 7/41; G01S 13/90
(52) U.S. Cl. ............................................. 342/90; 342/25
(58) Field of Search ............................... 342/25, 90, 27, 342/28

(56) References Cited

U.S. PATENT DOCUMENTS

| | | |
|---|---|---|
| 4,450,444 A | 5/1984 | Wehner et al. |
| 4,470,048 A | 9/1984 | Short, III |
| 4,972,193 A | 11/1990 | Rice |
| 4,992,797 A | 2/1991 | Gjessing et al. |
| 5,164,730 A | 11/1992 | Jain |
| 5,281,971 A | 1/1994 | Moulton |
| 5,281,972 A | 1/1994 | Jain |
| 5,381,154 A | 1/1995 | Guerci |
| 5,392,050 A | 2/1995 | Guerci et al. |
| 5,497,158 A | 3/1996 | Schmid et al. |

OTHER PUBLICATIONS

Chen, Jen–Shiun., "Radar Target Identification with Relative Amplitudes and Unknown Target Aspect Angles," Aerospace and Electronics Conference, 1990. NAECON 1990., Proceedings of 1990 National, 1990 p. 297–299.*

Zyl et al., "Inverse Synthetic Aperture Radar Images of Moving Targets", Communications and Signal Processing, 1991. COM Proceedings., South African Symposium on., pp. 42–46.*

*Primary Examiner*—Ian J. Lobo
(74) *Attorney, Agent, or Firm*—Whitham, Curtis & Christofferson, P.C.

(57) ABSTRACT

A target recognition system and method wherein only target amplitude data, i.e., coherent A-scan data, is interrogated for target recognition. Target aspect angle is ignored within the angular segmentation of the feature library without degrading classification performance. Observed signature characteristics are collected at various aspect angles and through unknown and arbitrary roll, pitch and yaw motions of each anticipated target and provided to a neural network as training sets. The neural network forms feature vectors for each target class which are useful for valid classification comparisons in all sea states, especially in calm and littoral waters. These feature vectors are useful for valid classification comparisons over at least 30 degrees of target aspect angle.

15 Claims, 5 Drawing Sheets

A-SCAN ISAR CLASSIFICATION SYSTEM AND METHOD THEREFOR

BACKGROUND OF THE INVENTION

1. Field of the Invention

The present invention generally relates to radar systems and radar signature identification methods and, more particularly, to methods and systems for automatically classifying targets imaged on Inverse Synthetic Aperture Radar systems.

2. Background Description

Synthetic Aperture Radars (SARs) produce a two-dimensional (2-D) image (with intensity as a pseudo non-spatial third image dimension) where one dimension in the image is a range and the other dimension is an azimuth (or cross range). Range is a measure of the "line-of-sight" distance from the radar to the target and is determined by measuring the time between the transmission of a radar signal to the receipt of the reflected signal (e.g., echo) from a target. The range resolution may be limited by the transmitted pulse width so that, for example, a narrow pulse width may be required to yield fine range resolution.

In order to produce a relatively fine azimuth resolution, a large antenna is needed to focus the transmitted and received energy into a sharp beam such that the sharpness of the beam defines the azimuth resolution. However, in many instances, a large antenna cannot be used due to the physical constraints of the radar platform. In these instances when a large antenna is required but cannot be used, a synthetic antenna (e.g., aperture) may be used in order to provide the needed fine azimuth (or cross range) resolution. In order to provide a synthetic aperture, a radar platform collects data while moving a certain known distance such that the distance moved is the dimension of the required antenna, thereby "synthesizing" the antenna (e.g., synthetic aperture). Thus, the term "synthetic aperture" is generally applied to the motion of the radar platform to effectively synthesize a relatively large array of transmitters and receivers (e.g., antennas).

Similar to the SAR, Inverse Synthetic Aperture Radars (ISAR) also produce a two-dimensional image (e.g., range and cross range, and intensity). However, the ISARs use the motion of the target to synthesize a large aperture antenna and not the motion of the radar platform itself. Thus, the term "inverse synthetic aperture" is generally applied to motion of the target which allows derivation of information concerning the shape and size of the target.

More specifically, ISARs are used to obtain information of a target at long range using the Doppler effect to produce an image by exploiting the relative motion of a target (typically pitching of a ship on an ocean surface) to develop an approximation of a visual profile of the target. In typical ISAR systems, the image produced is a two dimensional image (i.e., a 2-D Doppler versus range "picture") of the target, with each image being 512 pixels by 128 Doppler cells. Each range/Doppler pair has six bits of amplitude (intensity) data for pixel display. The profile image is developed as shown in FIG. 1 by assuming a center of rotation of the target and developing height versus range information based on the Doppler shift of the frequency of the returned signal.

While such systems have been quite successful in presenting images to trained personnel for interpretation, several major drawbacks have been encountered. Specifically, while rotational target motion need not be large for acceptable results to be obtained (i.e. about 1° of pitching motion is often sufficient), ISAR systems cannot produce a profile image if the target is stationary. Further, accuracy of the profile image development is also complicated and errors occasioned by other motions of the target such as roll and yaw. Therefore, the ISAR systems cannot be calibrated to provide any form of standardization of the profile images produced.

Moreover, automatic classification schemes require a computational "collapsing" of the profile image containing in excess of sixty thousand pixels, each represented by a six bit intensity value. As can be understood, the processing of the image is thus very computationally intensive and relatively slow in providing a response. For example, one proposed classification technique requires processing of several hundred images per classification with each of 512×128 pixels requiring 250 operations with 10 instructions per operation or roughly fifty billion computer operations per performed classification. It can be appreciated that classification can thus require several minutes of processing time on a relatively powerful high-speed data processor, and that processing times of much less than thirty seconds cannot be provided by processors currently practical for shipboard or airborne use.

Trained ISAR operators, using this technology, are able to identify surface combatants at large standoff ranges from the produced profile images. Unfortunately, this recognition skill is not trivial and a human operator must learn how to recognize distinct classes of ships in an ISAR image, requiring long training times. Typical training courses consist of an intensive course of several weeks duration to learn features of an ISAR image on which a classification may be based. Further, this recognition skill is easily lost because of the subtleties of differences of ISAR images and must be constantly reinforced and refreshed in order for the operator to retain such recognition skills. Some studies have suggested that the average operator only retains 20% of the ISAR recognition skill obtained during training after two weeks of training completion.

Consequently, automatic ISAR classification techniques have been proposed. These techniques process the ISAR image data, applying any number of pattern matching techniques against a library of known target types. These prior art approaches commonly apply image processing techniques (such as segmentation, noise rejection, major axis definition, edge detection, etc.) to enhance image recognition. However, pattern matching, whether of the entire image or particular features thereof, is particularly sensitive to the aspect of the target (i.e., the angle of the target relative to the direction of observation). Therefore, many images of each type of target to be classified or recognized must be first obtained, then maintained in an image library and processed against a given ISAR image. Thus, both data acquisition and database management present substantial difficulty in addition to data processing requirements.

State-of-the-art ISAR image classification requires processing data from hundreds of ISAR image frames. Typically, ISAR image classification requires several billion computations for several seconds for a single image while classification accuracy is known to be greatly improved by the processing of a plurality of images. Currently, there are no off-the-shelf mission computers with the processing capability to provide reasonably accurate classification in substantially real time. Consequently, available resources, in current off-the-shelf mission computers, fall far short of what is necessary to arrive at satisfactory recognition results. Thus, there is a need for reducing the number of computations performed in target classification on state of the art mission computers.

SUMMARY OF THE INVENTION

It is therefore an object of the present invention to reduce the number of computations necessary in target classification.

It is another object of the present invention to reduce the time necessary for target classification.

It is still another object of the present invention to increase the useable data to the classifier by reducing sensitivity to other target motions, for example, roll and yaw, and reducing sensitivity to the absence of target motion.

The present invention is a target recognition system and method wherein target amplitude data, known in the art as A-scan data, alone, is interrogated for target recognition. In the preferred embodiment method target recognition is on coherent A-Scan data, i.e., coherently integrated (over the ISAR aperture time) amplitude versus range data with aspect angle and other non-pitch target motions generally ignored within a 30 degree range without significantly compromising classification accuracy. Thus, the required computer resources for the preferred embodiment target recognition system are dramatically reduced over prior art systems while providing greatly enhanced speed of recognition with accuracy comparable to prior art systems. Also, the preferred embodiment of the present invention requires substantially reduced computer resources since the method of the present invention uses the coherent A-Scan data.

More specifically, a target recognition system comprises a receiver for receiving target echoed amplitude data and an interrogation apparatus (e.g., transmitter) for interrogating the target for echoed amplitude data and identifying the target as belonging to a particular target class. The received amplitude data is coherently integrated over the aperture time, and is preferably coherent A-scan data from an inverse synthetic aperture radar (ISAR). In the embodiments of the present invention, A-scan data is coherently integrated per range cell over an integration range swath (comprised of range cells of resolution commensurate with the radar's fidelity) centered on the target (where centering the range swath on the target involves removal and/or compensation for the effects of the relative range motion of the observing platform and target) and is limited to the largest target defined for the system to image. Moreover, the target aspect angle is used as an index into a feature library, where features correspond to target classes, are coarsely segmented by the aspect angle. The A-Scan data forms a feature vector (or signature) where comparisons to the segmented feature library yields target class.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
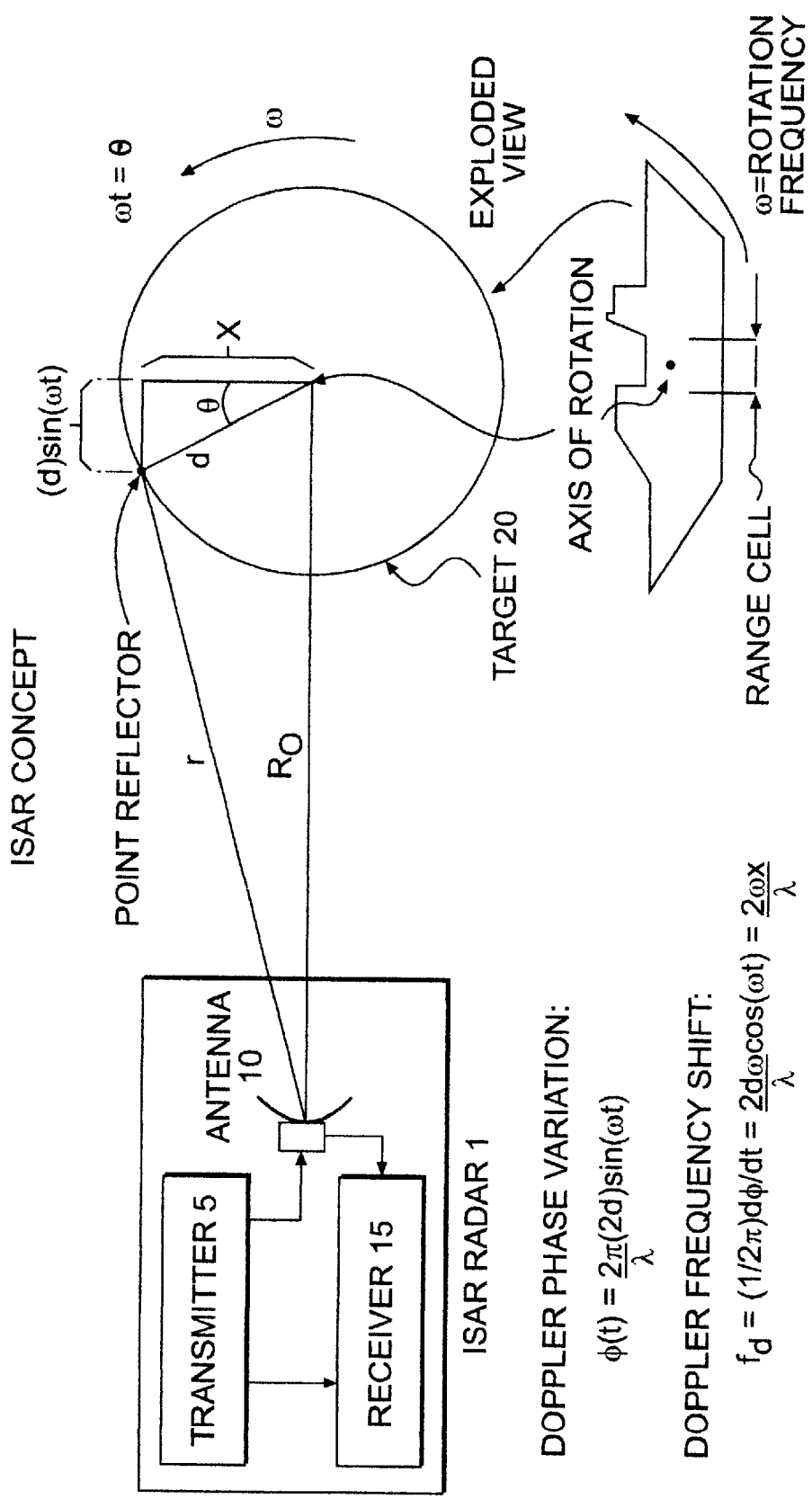
FIG. 1 schematically illustrates the basic principles of inverse synthetic aperture radar imaging.

Referring now to the drawings and, more particularly to FIG. 1, there is illustrated, in highly schematic form, the basic environment of an inverse synthetic aperture radar system. All radar systems 1 basically include a transmitter 5 for generating an electromagnetic wave, and an antenna for radiation and receipt of the electromagnetic wave reflected by the target, and a receiver 15 for receiving the antenna collected energy and processing the same in a selective manner. It is, of course, preferred that the receiver 15 preserve as much information as possible that may be included in the reflected energy so as to accurately image the target 20.

Figure 4:
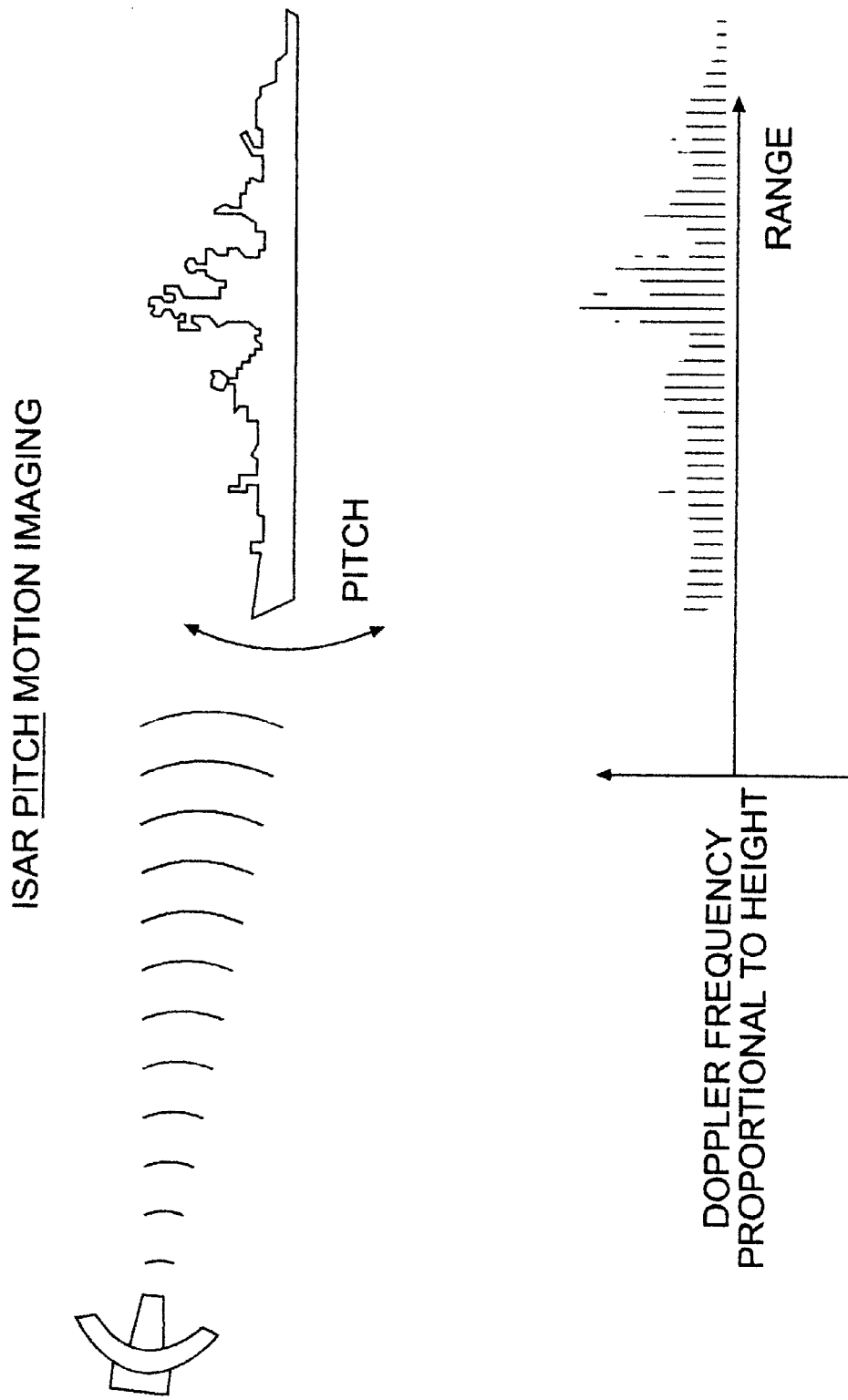
FIG. 4 is an example of a two-dimensional ISAR image created by pitch motion.

Still referring to FIG. 1, the target 20 is depicted as a seaborne vessel such that the natural motion of the vessel such as, for example, pitching about an assumed center of rotation due to encountering waves, causes differences in relative motion of portions of the vessel. Thus, structural features farther from the center of rotation (e.g. higher) will have a higher velocity and cause greater Doppler shift in the reflected signal such that the frequency shift in the reflected signal is a relative measure of the height of the feature reflecting that signal in that range cell. More generally, the doppler frequency yields resolution along an axis normal to the axes of target rotation and the radar's line-of-sight to the target. Thus, the cross axis resolution is equal to the radar's wavelength $\lambda$ divided by two times the angular rotation viewed over the aperture time. Thus, mapping both the intensity encoded frequency and the range of the returned signal in two dimensions can provide a relatively accurate image of the physical profile of the vessel and thus provide for identification or classification of the vessel at very long range. This is depicted in FIG. 4.

However, the accuracy of the profile is only approximate and other target motions, i.e., roll and yaw and other viewing angles degrade image quality. Furthermore, substantial experience is required to recognize configurations of features of the image produced which, in combination, allow recognition of a target or a class of possible targets. As discussed above, training sufficient for this purpose must be intensive while the capability of recognizing targets is substantially lost over a period of time comparable to that during which the capability was acquired.

In order to overcome the shortcomings of insufficient training and/or skill retention after training, application of feature extraction or image recognition techniques to ISAR images have been developed. However, current systems require numerous processes to be applied to a relatively large number of image values and thus require an extremely large number of individual data processing operations.

Figure 2:
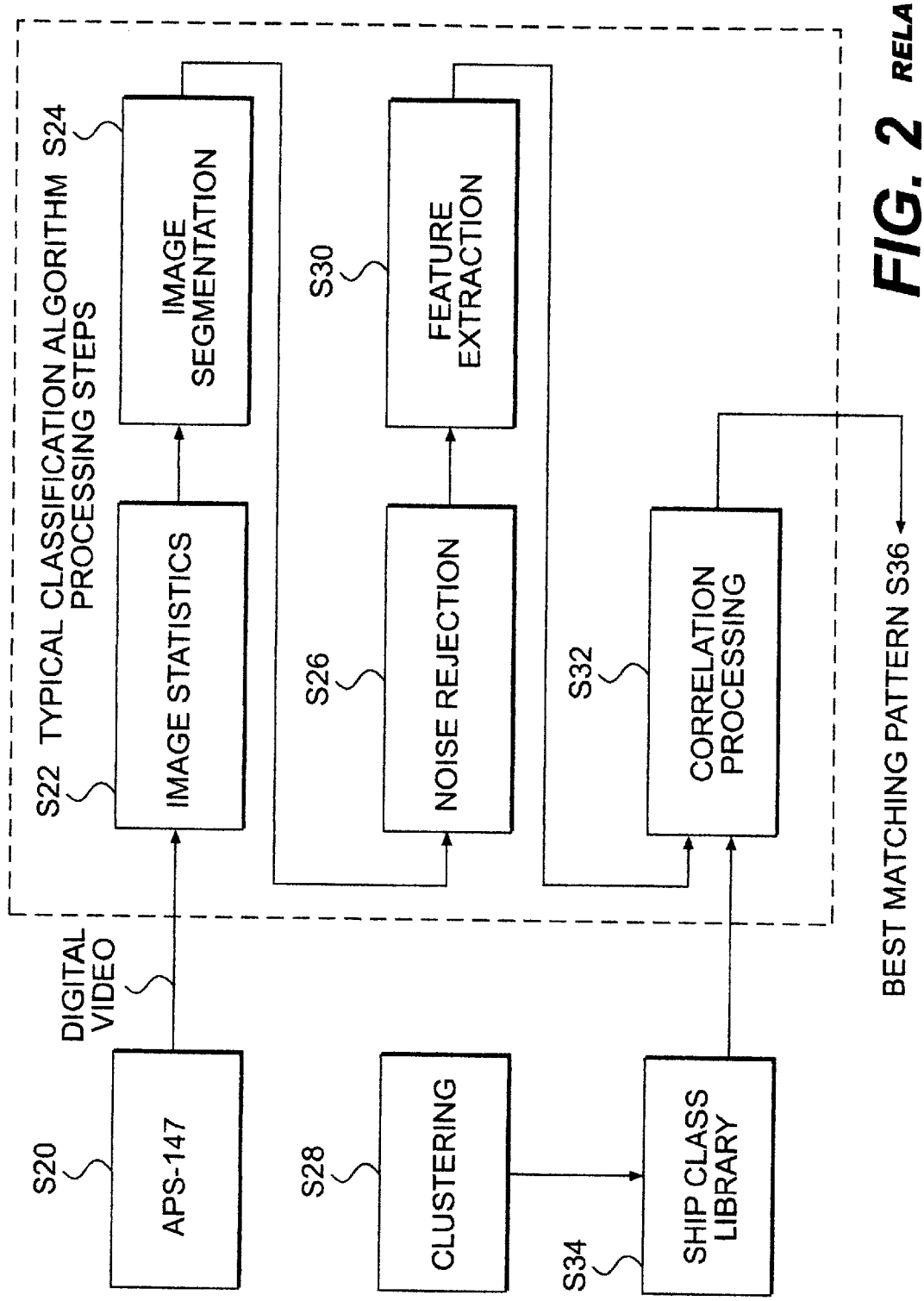
FIG. 2 is a flow diagram of an image processing system required for classification of ISAR images.

More specifically, FIG. 2 shows a generalized flow diagram of a related system to the present invention that includes image processing operations capable of successful image recognition using ISAR data. It should be understood that FIG. 2 may equally represent a high level block diagram of an image processing/classification system which implements the steps of the flow diagram now depicted in FIG. 2. It is further to be understood that the processing operations of FIG. 2 require large available computer resources which are beyond the capability of off-the-shelf mission computers to provide reasonably accurate classification in substantially real time image recognition and verification.

The steps of FIG. 2 show a system using a two-dimensional profile image of the target for classification (i.e., intensity encoded doppler (height) versus range). At step S22, image statistics are provided on the incoming digital image received from an imaging radar (step S20), preferably an ISAR. These statistics may be, for example, mean and standard deviation of pixel intensities. At step S24, the image is segmented from the receiver noise (or background picture noise) based on the image statistics and, at step S26, is filtered with a threshold routine to reduce image fluctuations, typically due to sea clutter. As is well known to one of ordinary skill in the art, image noise and clutter are the random or regular interfering effects in the data which degrade its information-bearing quality. In the extreme case, noise and clutter can eliminate the true radiometric information present in an image. Thus, noise and clutter removal are important and are used to improve the accuracy of the extracted data and the interpretation based thereof.

At step S28, the extracted target profile image is then transformed to a new pattern by feature extraction. Through prior data collections and observances of known targets, numerous feature vectors are extracted and clustered (a mathematical procedure for organizing data into homogeneous groups such that the between group variance of the specified number of groups is maximized) to form the basis of the classification library. At step S32, the new patterned feature and cluster data from a ship class library provided at step S34 are then correlated to provide a best matching pattern at step S36. As is commonly known in the industry, correlation is the ability to locate or match a pattern, sequence, image and the like with a corresponding pattern, sequence, image and the like which can be taken at a different time at a different viewing angle, or in this case, from a ship library.

As can be seen, many processing steps must be performed in order to obtain the best matching pattern. These processing steps typically are resource intensive, thus requiring robust processing systems. However, as discussed above, off-the-shelf mission computers currently available do not possess the necessary processing capability to provide reasonably accurate classification in substantially real time Solution Provided By the Method and System of the Present Invention In order to solve the problems of available computer resources needed for real time ISAR classification, the method of the present invention uses coherently integrated ISAR A-Scan data (e.g., one dimensional) instead of ISAR image data (e.g., two dimensional) in an automatic classification system. By using the one dimensional A-Scan data, the method and system of the present invention is capable of decreasing the computational resource loading by an order of magnitude over prior art systems, and further increase the speed of classification allowing for substantial real time classification of targets using processors of relatively modest processing power suitable and currently available for shipboard or airborne use.

In particular, the method of the present invention uses ISAR A-Scan data from a high range resolution ISAR radar which has the relative range motion of the observing platform and target removed (where the same range slice of the target is maintained in the same relative range cell in the range swath), and is thus coherently integrated over the ISAR aperture time in a range swath centered on the target and extending only to the largest target for the system to image. The use of the coherently integrated A-Scan forms a high signal to noise return of the target's Radar Cross Section (RCS) for each high range resolution radar cell along the radar's line of sight path incident with the target over the observed range swath.

Thus, relative radar cross sections (amplitude) along the line of incidence forms a target signature for that given line of incidence through the target. This is otherwise known as the target's "aspect angle" and is the angle of the target's main axis with the radar's line of incidence. This single unique signature, when compared to a database of previously observed signature characteristics provides for target type classification such as, in the case of ship targets, the ship's vessel class.

Observed signature characteristics using the method and system of the present invention are collected at various aspect angles and through unknown and arbitrary roll, pitch and yaw motions of each anticipated target. These signature characteristics are then used as training sets for a neural network, which may be any generic neural network currently known to those skilled in the art, such as, for example, MIT's Adaptive Clustering Network.

The neural network forms feature vectors for each target class and are useful for valid classification comparisons in all sea states, especially calm and littoral waters. Feature vectors may be collected over a range of aspect angles with a given set of feature vectors being derived from observance of a target at a single aspect angle. These feature vectors can be used for valid classification comparisons over at least 30 degrees of aspect angle. Thus, tracking data is used to index an appropriate 30 degree range of stored sets of feature vectors in the classification library. Hence, the preferred embodiment technique is robust in that as little as a single signature at a given aspect angle can be compared to the feature vectors defined for a corresponding range of aspect angles to provide accurate classification results within current state-of-the-art processing constraints.

Figure 5:
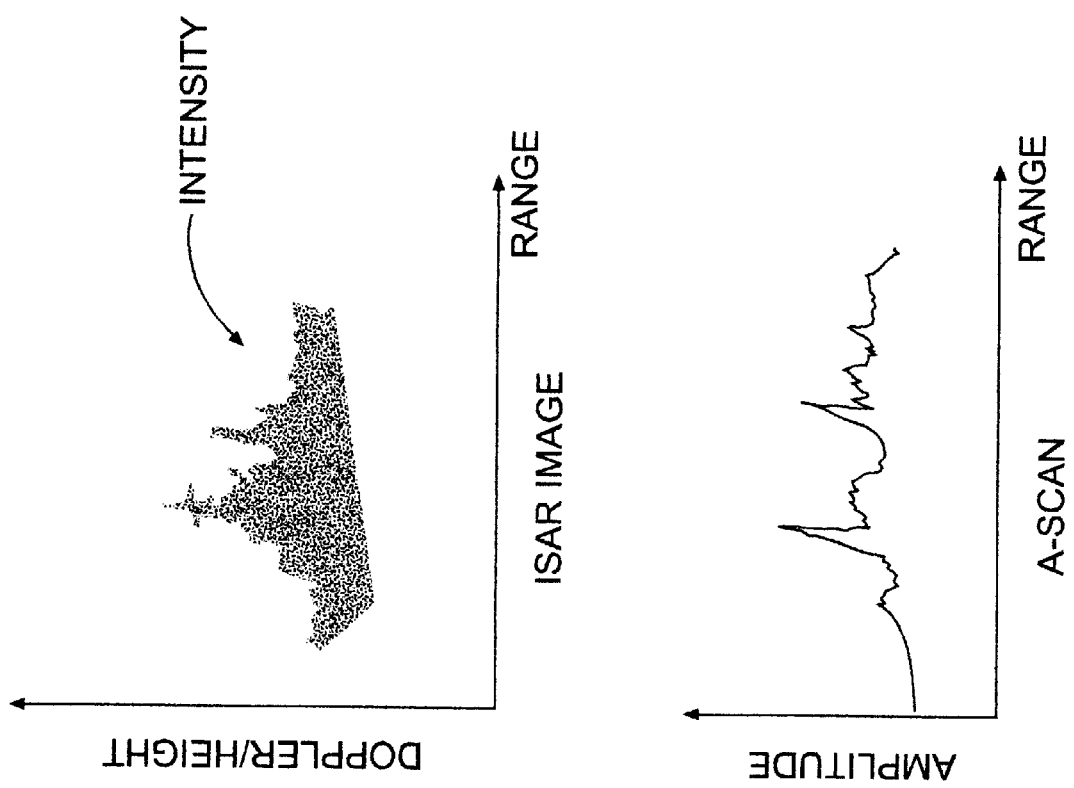
FIG. 5 is an illustration of the differences between ISAR images and A-Scan data.

It has been recognized that the above-described processing of an ISAR image using the method and system of the present invention substantially accomplishes a collapsing, RSS of the doppler intensities per range cell, of the Doppler/height information of the ISAR image into a one dimensional "signature", and it has been further discovered that target amplitude/intensity versus range data, alone, may be interrogated for target recognition as illustrated in FIG. 5. Further, performing target recognition or classification from amplitude data is substantially less sensitive to unwanted rotational motions for a given observance of the target, i.e., roll and yaw, in a pitch imaging scenario. Moreover, only a relatively small fraction of the data required for ISAR imaging is required for target recognition. Accordingly, a recognition or classification result is reached much more quickly with accuracy at least as good and in some instances better than ISAR image processing systems.

Having thus discovered that full image data is unnecessary, the preferred embodiment target recognition method and system uses the coherently integrated amplitude versus range data, known in the art as A-scan data and often available within a radar system having ISAR capability, for example, for the purpose of centering of the radar target for Doppler-range tracking. Further, in the preferred method and system of the present invention, aspect angle may thus be ignored within a 30 degree range without significantly compromising classification accuracy. Thus, by reducing the amount of data to be processed, i.e., A-Scan versus image, the required computer resources for target recognition are dramatically reduced over prior art systems. Also, the method and system of the present invention is preferably used with the APS-147 radar developed for the LAMPS Mark III Block II Upgrade Program. However, any high range resolution ISAR radar with available coherent A-scan data would be suitable for use with the method and system of the present invention.

Figure 3:
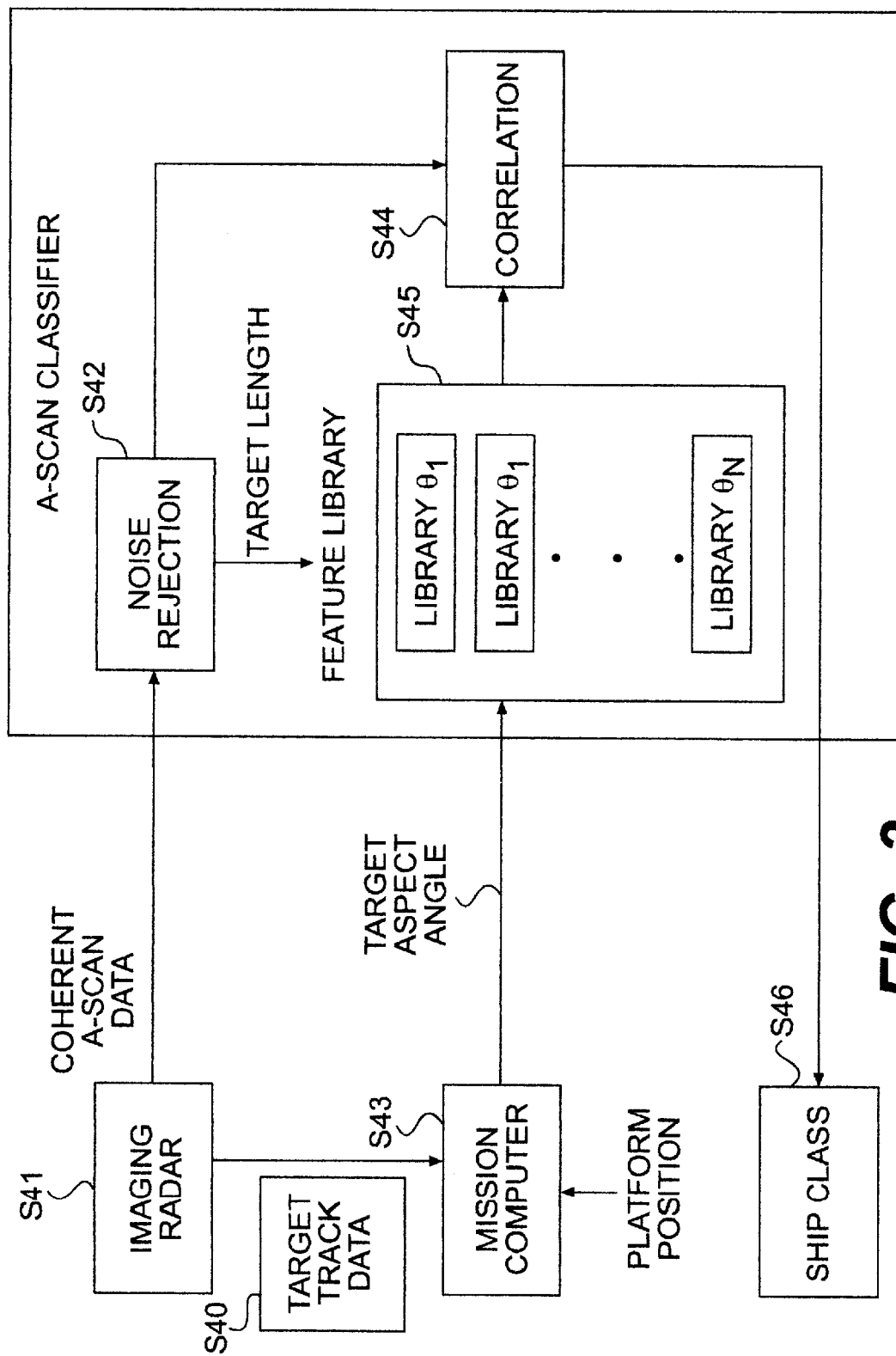
FIG. 3 is a flow diagram of the image classification system in accordance with the present invention.

Now referring to FIG. 3, a flow diagram of the image classification system in accordance with the present invention is shown. It is well understood by one of ordinary skill in the art that FIG. 3 may equally represent a high level block diagram of an image processing system which implements the steps of the flow diagram of FIG. 2. It is also well understood that the high level block diagram represents a preferred architecture and provides enhanced performance to known ISAR systems. Further, as seen compared to FIG. 2, many processing steps have been eliminated in FIG. 3. This is due to the use of the coherent A-Scan data which uses less computation resources thereby decreasing processing time.

Still referring to FIG. 3, prior to ISAR imaging mode, the operator selects the desired target track at step S40 to begin the ISAR classification process. Once the radar is in the ISAR mode, at step S41, the A-Scan data begins to be delivered to the ISAR classifier of the present invention. At step S42, the A-Scan is filtered with a threshold routing to reduce the fluctuations in the A-Scan, typically due to sea clutter. In the preferred embodiments, the noise rejection filter will also provide a coarse target length estimation used to index into the correct partition of the feature library at step S45.

The mission computer communicating with the method and system of the present invention will use the available track data and the platform's current position to determine the target aspect angle (i.e., the view angle of the target) at step S43. Once the aspect angle has been determined, the information is passed to the ISAR A-Scan classifier library for library selection (step S45) and for correlation processing (step S44). Since the track heading may not be precisely known, the angular resolution of the library partitions are preferably as large as the expected target heading errors. The track heading may thus be used as the aspect angle within the recognition latitude provided by the invention and the aspect angle used to index access to the feature library further reducing comparisons to be processed.

At step S44, the library selection data and the filtered A-Scan data are correlated, and best match ship class is thus obtained at step S46. By correlating with the filtered A-Scan data with the partition of the library that corresponds to the aspect angle, the search for the best match ship class is reduced.

Once the correlation has been performed, simple distance checks may be implemented to verify the ship choice in the embodiments of the present invention. These distances are statistical distances between the returned signatures and the library data, and are not referring to range. If these distances are too large (outside statistical range), the target is classified as "UNKNOWN". If the distances are normative, i.e., statistically consistent minimum distances, the class is added to the histogram, and after several images have been classified, the class histogram is presented to the operator in a tabular display. In the preferred embodiment, a statistical check using multidimensional chi-square comparisons is contemplated for use with the present invention. It is well understood by one of ordinary skill in the art that the normative distance may be any predefined distance; however, it is realized that the lesser distance from the cluster to the feature vector (A-Scan data) results in a more accurate classification (e.g., reduction in misclassifications).

By way of illustrative example, utilizing the above method, several clusters and distances from cluster to feature vector may be determined as represented in Table 1.

| Cluster Number | Distance from Cluster to Feature Vector |
| --- | --- |
| 1 | 273 |
| 2 | 221 |
| 3 | 134 |
| 4 | 119 |
| 5 | 252 |
| 6 | 318 |

In this example, the method as described above will determine if any of the above distances are too large in order to provide an accurate classification. Taking cluster 4 with a minimum distance of 119 as an example, the method of the present invention will employ a statistical check (e.g., a multidimensional chi-squared comparison) to determine if that minimum distance is consistent with a match. For example, if the distance of 119 is within the $90^{th}$ percentile for the chi-squared distribution with 512 degrees of freedom, the class that is associated with cluster 4 would be added to the class histogram. However, if this distance is too large (e.g., within the $80^{th}$ percentile), it would be classified as "UNKNOWN" even though there is a class associated with the $4^{th}$ cluster. It is to be understood that the above example is provided for illustrative purposes only and that other percentile for the chi-squared distributions may equally be used with the present invention.

It should be well understood that the method of the present invention can be implemented using a plurality of separate dedicated or programmable integrated or other electronic circuits or devices (e.g., hardwired electronic or logic circuits such as discrete element circuits, or programmable logic devices such as PLDs, PLAs, PALs, or the like). A suitably programmed general purpose computer, e.g., a microprocessor, microcontroller or other processor device (CPU or MPU), either alone or in conjunction with one or more peripheral (e.g., integrated circuit) data and signal processing devices can be used to implement the invention. In general, any device or assembly of devices on which a finite state machine capable of implementing the flow charts shown in the figures can be used as a controller with the invention.

Example of the Method and System of the Preferred Embodiment of the Present Invention The most important metric which quantifies the performance of an automatic classification algorithm is classification accuracy, or more precisely, probability of correct classification. In order to provide for correct classification in the present invention, a performance baseline was computed by using the MIT Adaptive Clustering Network (ACN) (See, An Automatic Ship Classification System for ISAR Imagery, The Lincoln Laboratory Journal, Volume 6, Number 2, 1993) on a data set representing 22 ship classes containing approximately 7500 training images. A set of approximately 500 testing images was then used to verify the accuracy of the algorithm and set the classification performance benchmark.

The data was then decomposed into A-Scans and the ACN was retrained and retested. Overall the MIT approach yielded a probability of correct classification of 0.57 and the A-Scan approach was 0.64. The following table compares the two approaches (e.g., MIT ACN vs. A-Scan) from a computational complexity standpoint:

|  | Training Vectors | Testing Vectors | # of Clusters | RISC Instructions | Time to Execute |
|---|---|---|---|---|---|
| MIT ACN | 7214 | 449 | 38 | Unknown | 2.806 |
| A-Scan | 7214 | 449 | 61 | 11,767,575 | 0.277 |

The number of RISC instructions is expressed as

RISC instructions=$14Nt+26NcNt+60(Nc)^2+31Nc+24$.

Nt=number of training vectors
Nc=number of clusters

While there is essentially no statistically significant performance difference between the two methods with respect to accuracy, an order of magnitude less time is obtained using the A-Scan computations performed on the same data sets in accordance with the invention. The advantage of the A-Scan method is thus the ability to process a larger number of images in the same amount of time allowing the use of off-the-shelf mission computers. Specifically, and as a comparison, in the above example, 2.806 seconds were needed to process one image using the MIT approach. However, the method of the present invention using the A-Scan may processes 11 images in the same time period.

While the invention has been described in terms of preferred embodiments, those skilled in the art will recognize that the invention can be practiced with modification within the spirit and scope of the appended claims.

We claim:

1. A target recognition system comprising:
   receiving means for receiving target amplitude data;
   interrogation means for interrogating said received target amplitude data and identifying said target as belonging to a particular target class in a feature library, said feature library being segmented by plural aspect angles.

2. The target recognition system of claim 1 wherein said received amplitude data is coherently integrated over time.

3. The target recognition system of claim 2 wherein said coherently integrated data is coherent A-scan data from an inverse synthetic aperture radar (ISAR).

4. The target recognition system of claim 3 wherein said coherent A-scan data is coherently integrated over the aperture time.

5. The target recognition system of claim 4 wherein said target aspect angle is used as an index into a feature library coarsely segmented by the aspect angle.

6. The target recognition system of claim 5 wherein said coherent A-scan data is coherently integrated over an integration range swath centered on the target and is limited to a largest target defined for said system to image.

7. The target recognition system of claim 1, wherein said interrogation means uses ISAR A-Scan data from a high range resolution ISAR radar which has a relative range motion of an observing platform and target removed.

8. The target recognition system of claim 7, wherein the A-Scan data is coherently integrated over an ISAR aperture time in an observed range swath centered on the target, removal of the relative range motion of the observing platform and target, and extending only to a largest target for the target recognition system to image.

9. The target recognition system of claim 8, wherein the coherently integrated A-Scan data forms a high signal to noise return of the target's Radar Cross Section (RCS) for each high range resolution radar cell along a line of sight path incident with the target over the observed range swath.

10. A method of radar target recognition comprising the steps of:
    receiving target amplitude data;
    interrogating said received target amplitude data; and
    identifying said target as belonging to a particular target class in a feature library, said feature library being segmented by plural aspect angles.

11. A method of radar target recognition as in claim 10, wherein said received target amplitude data are collected at aspect angles through unknown and arbitrary roll, pitch, and yaw motions over a wide range of sea states, including calm and litoral water conditions.

12. A method of radar target recognition as in claim 11, wherein a plurality of said feature vectors are derived from observance of a corresponding target at a single aspect angle.

13. The method of claim 11, wherein
    said step of receiving target amplitude data further develop radar target amplitude data and aspect angle data,
    said step of interrogating said target amplitude data further determines features thereof.

14. The method of claim 13, further comprising:
    comparing said features to feature data corresponding to anticipated targets in a feature library, said feature library being segmented by target aspect angle ranges and accessible in accordance with said aspect angle data, and
    classifying said target based upon said comparing step.

15. A method of operating a radar system utilizing radar amplitude data and aspect angle data therein, said method comprising steps of
    interrogating said radar amplitude data to obtain features thereof, and
    comparing said features to feature data corresponding to anticipated targets in a feature library, said feature library being segmented by target aspect angle ranges.

* * * * *